US009250695B2

(12) United States Patent
Tse (10) Patent No.: US 9,250,695 B2
(45) Date of Patent: Feb. 2, 2016

(54) METHOD AND APPARATUS FOR DISPLAYING A PREDETERMINED IMAGE ON A DISPLAY PANEL OF AN ELECTRONIC DEVICE WHEN THE ELECTRONIC DEVICE IS OPERATING IN A REDUCED POWER MODE OF OPERATION

(71) Applicant: MOTOROLA MOBILITY LLC, Libertyville, IL (US)

(72) Inventor: Lighten Tse, Round Lake, IL (US)

(73) Assignee: Google Technology Holdings LLC, Mountain View, CA (US)

(*) Notice: Subject to any disclaimer, the term of this patent is extended or adjusted under 35 U.S.C. 154(b) by 233 days.

(21) Appl. No.: 14/013,315

(22) Filed: Aug. 29, 2013

(65) Prior Publication Data

US 2014/0281607 A1    Sep. 18, 2014

Related U.S. Application Data

(60) Provisional application No. 61/790,861, filed on Mar. 15, 2013.

(51) Int. Cl.
| | |
|---|---|
| G06F 1/26 | (2006.01) |
| G06F 1/32 | (2006.01) |
| G09G 5/399 | (2006.01) |
| G09G 5/373 | (2006.01) |

(52) U.S. Cl.
CPC .............. *G06F 1/3287* (2013.01); *G09G 5/399* (2013.01); *G09G 5/373* (2013.01); *G09G 2320/046* (2013.01); *G09G 2330/022* (2013.01)

(58) Field of Classification Search
CPC ................................................... G06F 1/3287
See application file for complete search history.

(56) References Cited

U.S. PATENT DOCUMENTS 5,309,500 A * 5/1994 Koma ............... H04M 1/72519
                                                    368/47
6,429,840 B1   8/2002 Sekiguchi
(Continued)

FOREIGN PATENT DOCUMENTS

| EP | 1486939 A2 | 12/2004 |
| JP | 2000066648 A | 3/2000 |
| WO | 02069313 A2 | 9/2002 |

OTHER PUBLICATIONS

International Preliminary Report on Patentability from International Application No. PCT/US2014/017542, mailed Sep. 24, 2015, 9 pp.

*Primary Examiner* — Mohammed Rehman
(74) *Attorney, Agent, or Firm* — Shumaker & Sieffert, P.A.

(57) ABSTRACT

A display controller for use within an electronic device includes a dedicated memory and a low power display processor for displaying information when the electronic device is operating in a reduced power mode of operation (e.g., sleep mode). The memory stores display data for a predetermined image and the display processor supplies the display data to a display panel of the electronic device when the electronic device is operating in the reduced power mode. The display controller may also include a processor interface for receiving control information from the electronic device's device processor to enable the display processor to determine that the electronic device is operating in reduced power mode. The display processor may be configured to scale the stored display data when, due to memory size constraints, the memory stores the display data at a resolution that is different from (e.g., less than) the display panel resolution.

15 Claims, 5 Drawing Sheets

(56) References Cited

U.S. PATENT DOCUMENTS

| | | |
|---|---|---|
| 6,563,899 B1 * | 5/2003 | Matsumiya .................. 376/254 |
| 7,995,050 B2 | 8/2011 | Wong et al. |
| 2007/0077033 A1 * | 4/2007 | Shirai et al. .................. 386/107 |
| 2008/0143695 A1 | 6/2008 | Juenemann et al. |
| 2010/0235833 A1 * | 9/2010 | Huang et al. ...................... 718/1 |
| 2012/0230461 A1 * | 9/2012 | Ellis .......................... G06F 1/14 377/94 |

* cited by examiner

METHOD AND APPARATUS FOR DISPLAYING A PREDETERMINED IMAGE ON A DISPLAY PANEL OF AN ELECTRONIC DEVICE WHEN THE ELECTRONIC DEVICE IS OPERATING IN A REDUCED POWER MODE OF OPERATION

FIELD OF THE INVENTION

The present invention relates generally to display controllers and, more particularly, to a method and apparatus for displaying a predetermined image on a display panel of an electronic device when the electronic device is operating in a reduced power mode of operation.

BACKGROUND

A variety of portable electronic devices, such as cellular phones, smartphones, and multimedia devices, include display controllers (display drivers) to control the display of graphics and other images on display panels of the devices. Additionally, such electronic devices are typically configured to operate in either a full power mode or a reduced power mode (e.g., standby or sleep mode) at appropriate times. For instance, the devices are generally configured to operate in reduced power modes to conserve battery power during time periods when the devices are powered on, but are not being actively used by their users. A power management system of an electronic device may place the device in reduced power mode either automatically (e.g., after detecting that the device has not been used by a user for a period of time) or in response to manual activation of the reduced power mode by a user of the device, such as when the user knows that the device will not be actively used for a while.

In full power mode, an electronic device typically executes one or more applications that generate graphics or other images for display on the device's display panel. Each application sends image information to a graphics processor of the electronic device to produce display data for use by the display controller. The display controller then processes the display data to provide it in the proper format to the display panel.

By contrast, in reduced power mode, many portable electronic devices deactivate their display controllers (or at least portions thereof) so as not to display anything on their display panels. While such an approach saves precious battery power, it also leaves the device user in the dark, with no indication of whether the electronic device is on and no provision of even minimal information which may be of interest to the user, such as time of day, battery state of charge, signal strength, and so forth.

Figure 1:
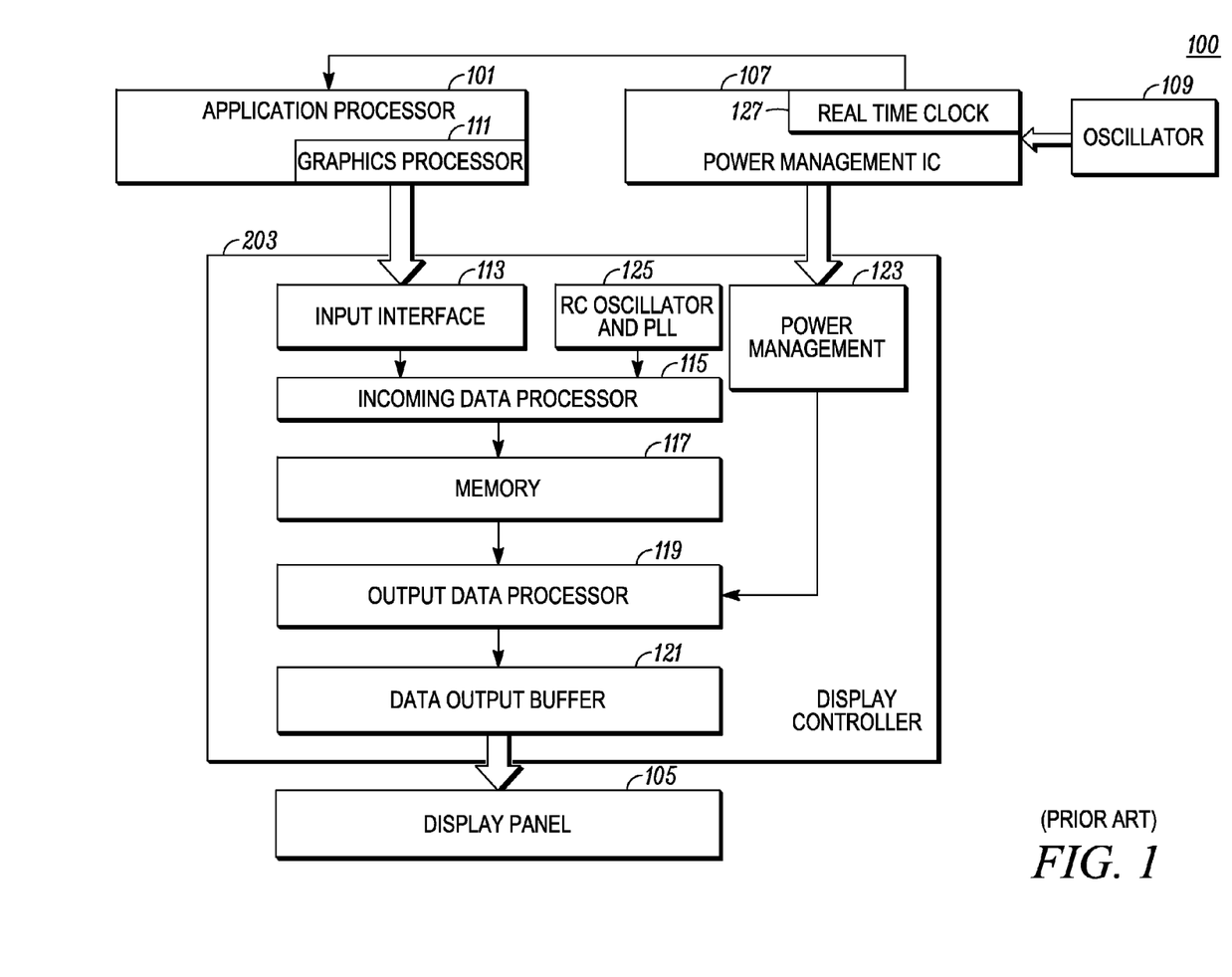
FIG. 1 is a partial electrical block diagram of an exemplary prior art electronic device having display capability.

A partial electrical block diagram of an exemplary prior art electronic device (e.g., a smartphone) 100 having display capability is illustrated in FIG. 1. The device 100 includes an application processor 101, a display controller 103, a display panel 105, a power management integrated circuit (IC) 107, and an oscillator 109 for use in establishing a clock signal for the electronic device 100. The application processor 101 includes a graphics processor 111 that produces display data for graphics and other images to be displayed in accordance with the requirements of the applications being executed by the applications processor 101. The display controller 103 (or, equivalently, display driver) typically includes an input interface 113, an incoming data processor 115, memory 117 for storing incoming display data, an output data processor 119, an output data buffer 121, a power management circuit 123, and a display system oscillator and phase locked loop (PLL) 125 to supply a timing reference for the display controller 103. The power management IC 107 typically includes a real time clock 127 that receives its timing reference from the oscillator 109. The real time clock 127 is typically used to provide a clock signal for the application processor 101 and various other digital components of the electronic device 100.

In operation, the application processor 101 executes applications that require display of certain images, such as graphics, photographs, and/or text. The display data for the images is generated by the graphics processor 111 and supplied to the display controller 103 via the input interface 113. The incoming data processor 115 processes the received display data and stores the display data in the display controller memory 117. The output data processor 119 retrieves the display data from the memory 117 in accordance with the frame rate and other display format parameters of the display panel 105 and directs the retrieved display data into appropriate locations of the data output buffer 121 for display on the display panel 105.

When the power management IC 107 detects a power management condition, such as expiration of an inactivity timer or receipt of a user input requesting that the electronic device 100 be placed into reduced power mode (e.g., standby or sleep mode), the power management IC 107 sends a control signal or command to the power management circuit 123 of the display controller 103. Upon receipt of the command from the power management IC 107, the display controller's power management circuit 123 sends a signal to the output data processor 119 instructing the output data processor 119 to stop supplying data to the data output buffer 121 for display on the display panel 105. The result of the power management processing is that the display panel 105 and part of the display controller 103 are deactivated. As discussed above, deactivating the display panel 105 and/or display controller 103 saves battery power, but it leaves the device user with no indication of whether the electronic device 100 is on and no provision of even minimal information which may be of interest to the user.

Skilled artisans will appreciate that elements in the figures are illustrated for simplicity and clarity and have not necessarily been drawn to scale. For example, the dimensions of some of the elements in the figures may be exaggerated alone or relative to other elements to help improve the understanding of the various exemplary embodiments of the present invention.

DETAILED DESCRIPTION

Generally, the present invention encompasses a method and apparatus for displaying a predetermined image on a display panel of an electronic device when the electronic device is operating in a reduced power mode of operation. According to one embodiment of the present invention, a display controller for use within the electronic device includes a processor interface, a memory, and a display processor. The processor interface is operable to receive control information from a device processor of the electronic device when the electronic device is operating in the reduced power mode of operation. The memory is operable to store display data for one or more predetermined images. The predetermined image may be any desired image, but preferably is an image that requires minimal display controller processing resources to display. For example, the predetermined image may be a time of day image, such as a digital clock image, a date (month/day) image, a battery state of charge meter image, a wireless signal strength meter image, a user's personal preference image, or an animation graphic. The display processor is operable in response to the control information to provide the display data for the predetermined image to the display panel so as to enable the display panel to display the predetermined image. The control information supplied by the device processor is primarily used as a triggering mechanism for the display processor to display the prestored image on the display panel, and does not include any display data. According to an alternative embodiment, the processor interface may be an inter-integrated circuit (I2C) interface and the control information may accordingly be an I2C command. Alternatively, the processor interface may be another low power, low-complexity, industry available interface.

According to a further embodiment of the present invention, the display controller may include a second processor interface that is operable to receive display data for one or more images from the device processor of the electronic device when the electronic device is operating in the full power mode of operation. In such a case, the two processor interfaces of the display controller may be time-multiplexed.

According to another alternative embodiment of the present invention, the display controller may include a pulse counter coupled between the processor interface and the display processor. In such a case, the processor interface may be an input to the pulse counter and the control information may be a pulse periodically received from the device processor. Where the predetermined image is a time of day image (e.g., a digital clock image), the pulse from the device processor may be received by processor interface at a time interval (e.g., every second or every minute) conducive for updating a time of day displayed in the time of day image. In such a case, the display processor determines a current time of day in response to the received pulse, adds the current time of day to the time of day image, and provides display data for the time of day image with the current time of day to the display panel.

According to yet another alternative embodiment of the present invention, the display processor may be operable to provide the display data to the display panel so as to cause the predetermined image to be displayed at varying locations on the display panel over time. In other words, the display processor may be configured to move the predetermined image to various positions on the display panel over time to prevent burn-in of the image on the display panel. In this case, the display data causes the predetermined image to be displayed in only a portion of the display panel, thereby enabling the image location to be changed on the display panel.

According to a further embodiment of the present invention, the display processor is further operable to process the display data to produce scaled display data that scales the predetermined image to a predetermined display resolution. In this case, the display data provided to the display panel is the scaled display data instead of the stored, unscaled display data. This embodiment may be used to reduce the amount of display data for the predetermined image that is stored in the dedicated memory of the display controller. The lower resolution data may be stored and then scaled to the display panel resolution at run time, thereby reducing the size requirements for the dedicated memory.

According to another embodiment of the present invention, the display processor may be further operable to perform a clock function and the predetermined image may be a time of day image. In this case, the display processor provides a current time of day in the display data for the time of day image to enable the display panel to display the current time of day in the time of day image.

According to a further embodiment of the present invention, an electronic device may be provided that includes the display controller described above. The electronic device may be smartphone, a cellular phone, a multimedia player, a personal digital assistant, a portable gaming device, a tablet computer, a laptop computer, or any other device that includes display capability and operates in full power and reduced power modes of operation.

Alternatively, the electronic device may be configured to include a device processor (e.g., an application processor), a display panel, and a display controller with a main display path that is active when the electronic device is operating in a full power mode and an alternative display path that is activated when the electronic device enters a reduced power mode. In the case of such an alternative electronic device, the main display path of the display controller may include a first processor interface operable to receive first display data from the device processor when the electronic device is operating in the full power mode of operation, a first memory operable to store the first display data, and a first display processor operable to provide the first display data to the display panel to enable the display panel to display one or more images represented by the first display data. The display data for the images may have been generated by the device processor in response to or during execution of an application. The alternative display path of the display controller may include a second processor interface operable to receive control information from the device processor when the electronic device is operating in the reduced power mode of operation, a second memory operable to store second display data for a predetermined image, and a second display processor operable, responsive to the control information, to provide the second display data to the display panel to enable the display panel to display the predetermined image.

According to a further embodiment of the present invention, a method is provided for a display controller to display information on a display panel of an electronic device that is capable of operating in a reduced power mode of operation or a full power mode of operation. According to this embodiment, the display controller stores display data for a predetermined image in a memory of the display controller. At some later point in time, the display controller determines whether the electronic device is operating in the reduced power mode of operation. Responsive to determining that the electronic device is operating in the reduced power mode of operation, the display controller supplies the stored display data to the display panel to enable the display panel to display the predetermined image. In the event that the display panel is an organic light emitting diode (OLED) display panel or other display technology that is subject to burn-in, the display controller may be programmed or otherwise configured to supply the stored display data to the display panel so as to enable the display panel to display the predetermined image at varying locations on the display panel over time while the electronic device is operating in the reduced power mode of operation. Periodic movement of the predetermined image on the display panel reduces the likelihood of burn-in. Additionally or alternatively, if size constraints for the display controller memory prevent the storage of display data representing the predetermined image at a display resolution of the display panel, the display controller may be further programmed or otherwise configured to modify the display data based on a scaling value to produce scaled display data and supply the scaled data to the display panel to enable the display panel to display the predetermined image at the resolution of the display panel. In such a case, the scaling value may be determined as a ratio between the display panel resolution and a resolution at which the predetermined image was created.

By providing a display controller arrangement that prestores a predetermined image and displays it upon being alerted that its associated electronic device is operating in a reduced power or battery saving mode, the present invention provides a low power mechanism for indicating to a user that the electronic device is still on, but in reduced power mode. In this manner, the present invention provides for visual notice to a user as to the electronic device's state while mitigating the information required to be delivered from high power device processors, such as application processors, to the display controller. Further, by selecting the predetermined image to be a graphic that may be of interest to the user and is readily updatable by the display controller's display processor, such as a time of day and/or date, the present invention enables the electronic device to exhibit a sign of life while in reduced power mode and simultaneously provide useful information to the user.

Figure 2:
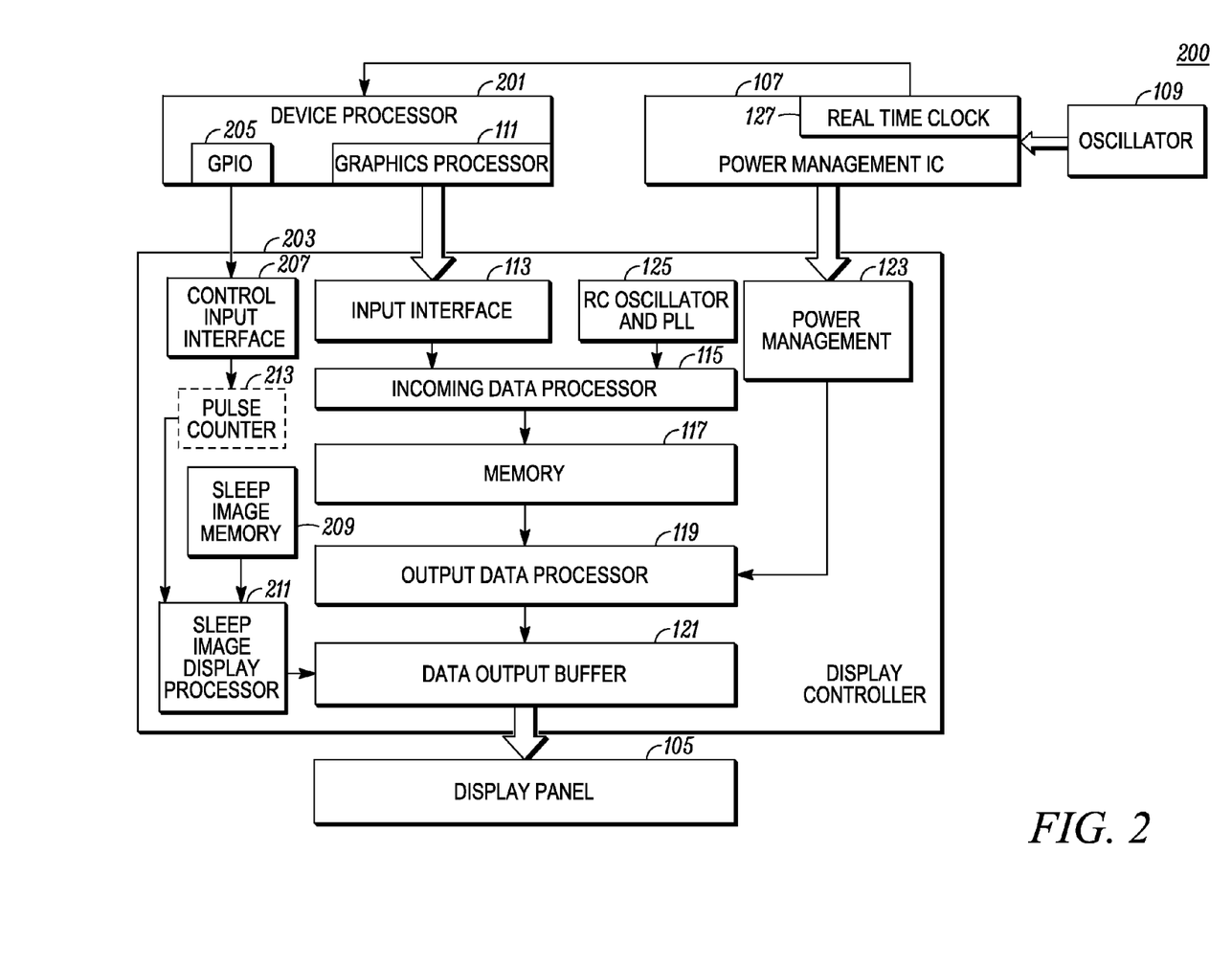
FIG. 2 is a partial electrical block diagram of an electronic device that includes a display controller which supports display of a predetermined image during a reduced power mode of the electronic device, in accordance with an exemplary embodiment of the present invention.

Embodiments of the present invention can be more readily understood with reference to FIGS. 2-5, in which like reference numerals designate like items. FIG. 2 illustrates a partial electrical block diagram of an electronic device 200 that includes a display controller 203 which supports display of a predetermined image during a reduced power mode of the electronic device 200, in accordance with an exemplary embodiment of the present invention. The electronic device 200 includes, inter alia, a device processor 201, the display controller 203, a display panel 105, a power management integrated circuit (IC) 107, and an oscillator 109 for use in establishing a clock signal for the electronic device 200. The electronic device 200 may be a smartphone, a cellular phone, a multimedia player, a personal digital assistant, a portable gaming device, a camera, a camcorder, a tablet computer, a laptop computer or any other electronic device that has display capability and operates in a reduced power mode at various times in order to conserve battery power.

The device processor 201 may be an application processor, a microprocessor, a microcontroller, a digital signal processor (DSP), a state machine, logic circuitry, or any other device or combination of devices that processes information based on operating or programming instructions stored in electronic device memory (not shown). One of ordinary skill in the art will appreciate that the device processor 201 can be implemented using multiple processors as may be required to handle the processing requirements of the electronic device 200. One of ordinary skill in the art will further recognize that when the device processor 201 has one or more of its functions performed by a state machine or logic circuitry, the memory containing the corresponding operating instructions can be embedded within the state machine or logic circuitry as opposed to being external to the device processor 201.

Similar to the conventional application processor 101 described above with respect to FIG. 1, the device processor 201 may include a graphics processor 111 that produces display data for graphics and other images to be displayed in accordance with the requirements of applications being executed by the device processor 201. However, in contrast to a conventional application processor 101, the device processor 201 of the electronic device 200 includes a control output interface (GPIO) 205 through which the device processor 201 can communicate control information to the display controller 203 to inform the display controller 203 that the electronic device 200 is operating in a reduced power mode of operation. In one embodiment, the control information is a minimal amount of information necessary to inform the display controller 203 as to the state of the electronic device. Alternatively, the control information may include minimal data (e.g., a few bits) or a signal, such as a periodic pulse, to enable the display controller 203 to generate and update content displayed in a prestored, predetermined image, as described in more detail below. Because the control information provided through the control output interface 205 is intentionally minimal so as not to cause the electronic device 200 to exit its reduced power mode, the control information provided through the control output interface 205 excludes any display data generated by the graphics processor 111.

According to one embodiment, the display controller 203 (or, equivalently, display driver) includes all or substantially all of the display path elements of a conventional display controller 103 as illustrated in FIG. 1, including an input interface 113, an incoming data processor 115, memory 117 for storing incoming image data, an output data processor 119, an output data buffer 121, a power management circuit 123, and a display system oscillator and phase locked loop (PLL) 125 to supply a timing reference for the display controller 203. These elements may form a main display path for the display controller 203, which operates in a conventional manner when the electronic device 200 is operating in a full power mode of operation. In particular, the display data generated by the graphics processor 111 is supplied to the display controller 203 via the input interface 113. The incoming data processor 115 processes the received display data and stores the display data in the main display controller memory 117. The output data processor 119 retrieves the display data from the main memory 117 in accordance with the frame rate and other display format parameters of the display panel 105 and directs the retrieved display data into appropriate locations of the data output buffer 121 for display on the display panel 105. The elements of the display controller's main display path are well known in the art; therefore, no further discussion of them will be presented except as may be necessary in order to facilitate an understanding of the present invention.

Figure 3:
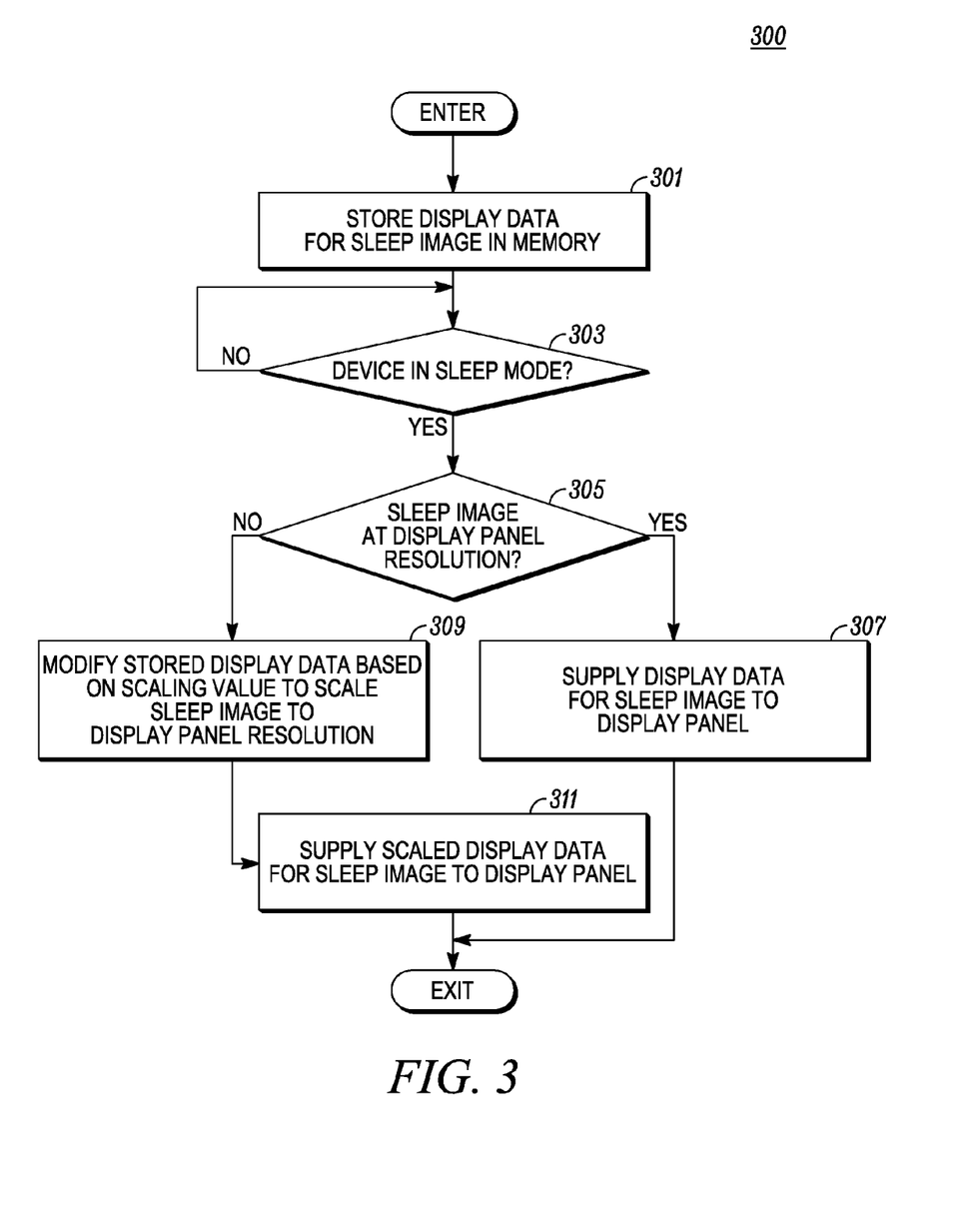
FIG. 3 is a logic flow diagram of steps executed by a display controller to display a predetermined image on a display panel of an electronic device when the electronic device containing the display controller is operating in a reduced power mode of operation, in accordance with an exemplary embodiment of the present invention.
Figure 5:
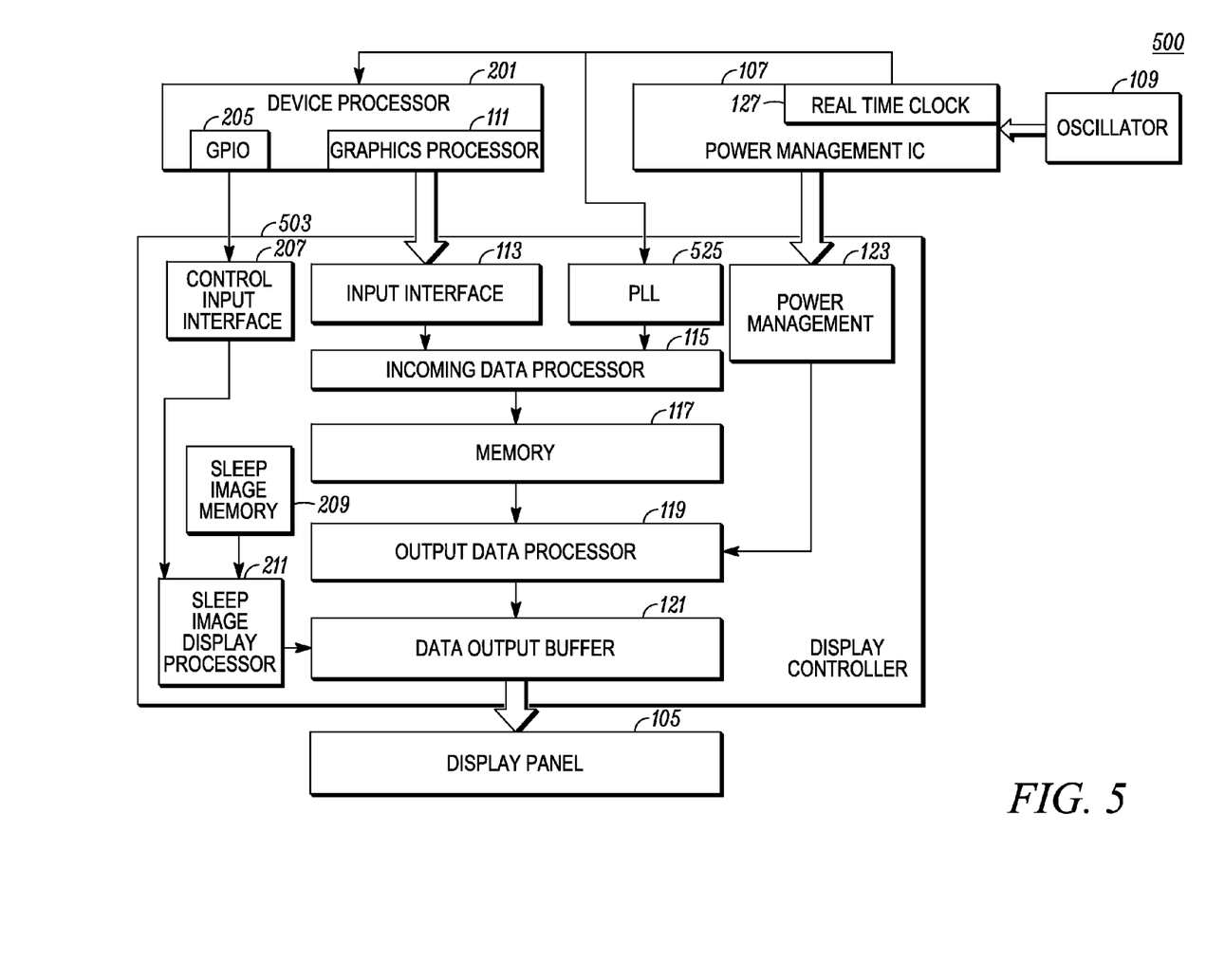
FIG. 5 is a partial electrical block diagram of an electronic device that includes a display controller which supports display of a predetermined image during a reduced power mode of the electronic device, in accordance with an alternative exemplary embodiment of the present invention.

In addition to having a conventional main display path, the display controller 203 includes an alternate, reduced power mode display path for displaying a prestored image when the electronic device 203 is operating in a reduced power mode (referred to as "sleep mode" in FIGS. 2, 3, and 5). The alternate display path includes a control input interface 207, a sleep image memory 209 for storing a predetermined image, and a sleep image display processor 211. The alternate display path may optionally include a pulse counter 213 where the control input interface 207 is configured to receive a periodic pulse from the control output interface 205 of the device processor 201.

In the alternate display path, the control input interface 207 may be an I2C interface or other minimally complex interface to receive control information (e.g., an I2C command or an update signal (e.g., a pulse)) from the control output interface 205 of the device processor 201. Alternatively, the control input interface 207 may be time-multiplexed with input interface 113 of the main display path, through which display data is received from the graphics processor 111 when the electronic device 200 is operating in full power mode. In such a case, the alternate display path may share common hardware (e.g., a common signal line) with the main display path, but would still be a separate display path from a logical perspective. Further, when the alternate display path of the display controller 203 includes a pulse counter 213, the control input interface 207 may serve as an input to the pulse counter 213 and periodically receive a pulse from the control output interface 205 of the device processor 201 (e.g., when such a pulse is used to enable the sleep display image processor 211 to update a time of day image on the display panel 105, as discussed in more detail below).

The sleep image memory 209 stores display data for a predetermined image which is to be displayed on the display panel 105 while the electronic device 200 is in reduced power mode. The sleep image memory 209 may include random access memory (RAM), read-only memory (ROM), flash memory, electrically erasable programmable read-only memory (EEPROM), and/or various other forms of memory as are well known in the art. It will be appreciated by one of ordinary skill in the art that the sleep image memory 209 may form a part of the main display controller memory 117, which is dedicated to storing the predetermined image to be displayed while the electronic device 200 is in reduced power mode.

The sleep image display processor 211 may be a microprocessor, a microcontroller, a DSP, a state machine, logic circuitry, or any other device or combination of devices that processes information based on operating or programming instructions stored or coded in internal memory (not shown) of the sleep image display processor 211. According to one embodiment of the present invention, the programming instructions stored in the sleep image display processor 211 cause the sleep image display processor 211 to provide display data stored in the sleep image memory 209 to the display panel 105 (e.g., via the data output buffer 121) in response to receipt of control information from the control output interface 205 of the device processor 201.

The display panel 105 may be any conventional or future-developed display, such as a liquid crystal display (LCD), a plasma display, a light emitting diode (LED) display, an organic LED (OLED) display, or any other display technology. The operational program coded into the sleep image display processor 211 preferably takes into account the display technology used for the display panel 105 to mitigate burn-in or other undesired effects, where the display panel technology is susceptible to such undesired effects.

Figure 4:
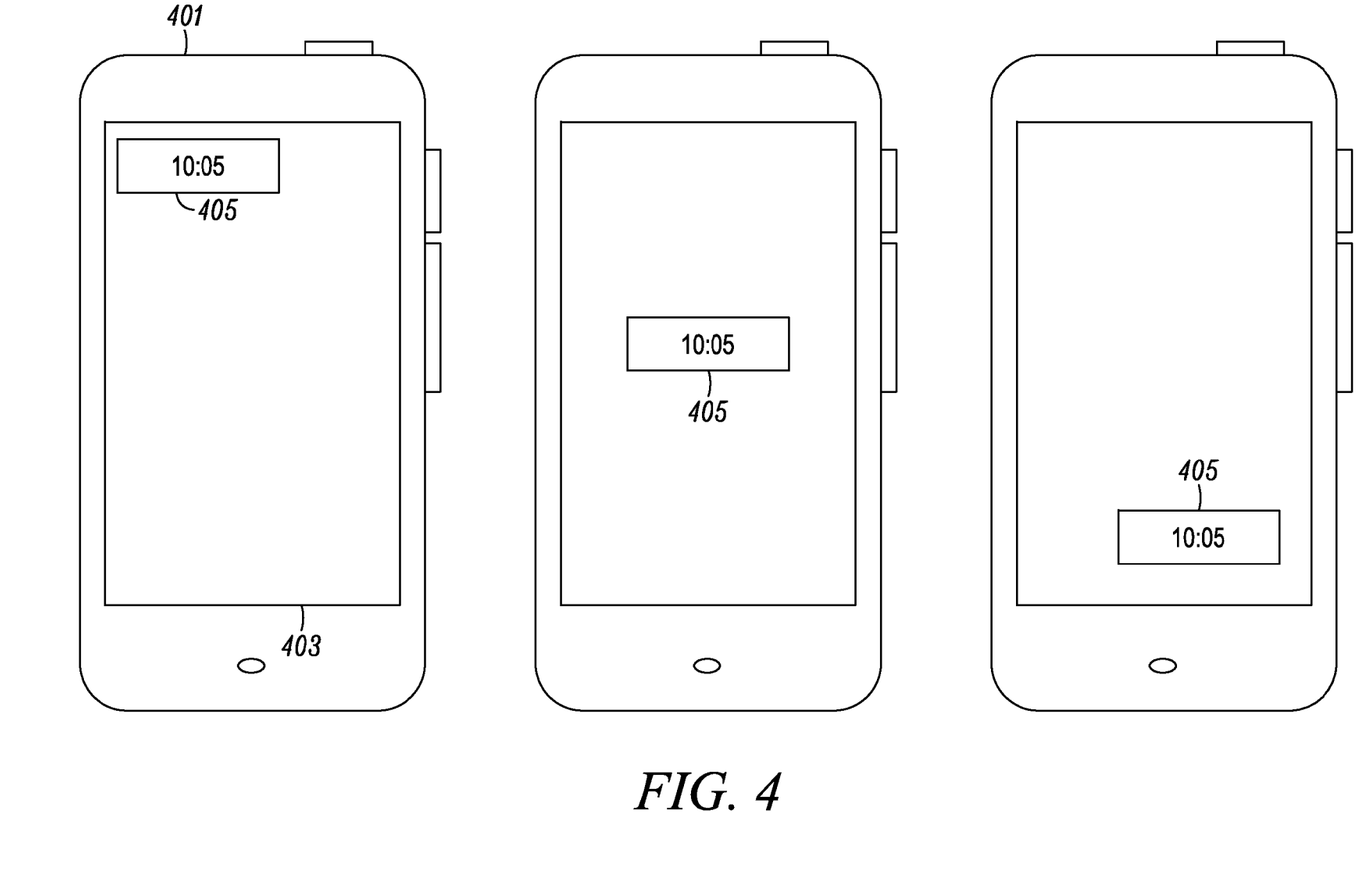
FIG. 4 illustrates the display over time of a predetermined image at various locations on a display panel of an electronic device, in accordance with another exemplary embodiment of the present invention.

Operation of the electronic device 200 and its associated display controller 203 in accordance with exemplary embodiments of the present invention may be further understood with reference to FIGS. 2-4. Referring to FIG. 3, a logic flow diagram 300 is depicted illustrating steps executed by the display controller 203 in accordance with exemplary embodiments of the present invention. The logic flow steps may be executed by various components of the display controller 203, including, but not limited to, the control input interface 207, the sleep image memory 209, and the sleep image display processor 211, with most of the logic flow steps being executed by the sleep image display processor 211. The steps executed by the sleep image processor 211 are preferably performed in accordance with the operating instructions (e.g., a firmware computer program) stored in internal memory of the sleep image processor 211.

According to the logic flow, display data for a predetermined image (sleep image) is stored (301) in the sleep image memory 209. Storage of display data for the predetermined image may be performed during manufacturing of the display controller 203 or the electronic device 200. Alternatively, display data for the predetermined image may be stored in the sleep image memory 209 after manufacturing of the display controller 203, such as through a subsequent download of the image display data from a server.

The predetermined image for which display data is stored in the sleep image memory 209 may be any graphic or other image, although the predetermined image is preferably a graphic having minimal features so as to mitigate the size of the sleep image memory 209 and minimize the semiconductor space necessary to create the memory 209 on an integrated circuit used to form the display controller 203. For example, the predetermined image may be a time of day image (e.g., in a digital clock format, such as hh:mm), a calendar date (e.g., in the form mm/dd/yyyy), a battery fuel gauge/state of charge image, a wireless signal strength image (where the electronic device 200 has wireless communication capability), a thumbnail photograph, or any other image as may be selected by the electronic device user, the electronic device manufacturer, or the display controller manufacturer. According to one embodiment, the predetermined image is an image that is small in size, occupying only a portion of the display panel 105 (e.g., less than half of the area of the display panel 105) when displayed on the display panel 105. Additionally, the display data stored in the sleep image memory 209 for the predetermined image may have been created at a resolution of the display panel 105 or at a resolution that is different than the resolution of the display panel 105. For example, the display data for the predetermined image may have been created at a resolution that is less than the resolution of the display panel in order to minimize the amount of display data required to be stored in the sleep image memory 209, furthering the effort to minimize the size of the sleep image memory 209.

Some time after the predetermined image has been stored in the sleep image memory 209 and during operation of the electronic device 200, the display controller 203 determines (303) whether the electronic device 200 has entered a reduced power mode of operation. Such a determination may be made based on whether or not the control input interface 207 of the display controller has received control information from the control output interface 205 of the device processor 201. When control information has been received by the control input interface 207 and supplied to the sleep image display processor 211, the sleep image display processor 211 may determine that the electronic device 200 is in reduced power mode. Alternatively, where control information is continually received from the device processor 201 by the control input interface 207, the content of the control information may inform the sleep image display processor 211 as to whether the electronic device 200 is in reduced power mode. For example, where the control information supplied by the device processor 201 is a single bit, receipt of one bit (e.g., a "1") may indicate the electronic device 200 is in reduced power mode; whereas, receipt of a different bit (e.g., a "0")

may indicate the electronic device 200 is not in reduced power mode (or, equivalently, is in full power mode).

Still further, the sleep image display processor 211 may determine that the electronic device 200 is in reduced power mode by monitoring the output of the power management circuit 123 of the display controller 203. As is known in the art, when the electronic device 200 enters reduced power mode, the power management IC 107 sends a control signal or command to the power management circuit 123 of the display controller 203. Upon receipt of the command from the power management IC 107, the display controller's power management circuit 123 sends a signal to the output data processor 119 instructing the output data processor 119 to stop supplying data to the data output buffer 121 for display on the display panel 105. According to one embodiment of the present invention, the signal sent by the power management circuit 123 to the output data processor 119 may also be sent to the sleep image display controller 211 and be used to trigger retrieval of the predetermined image from the sleep image memory 209.

According to yet another embodiment, the control output interface 205 may form part of the power management IC 107 instead of being part of the device processor 201. In this case, the sleep image display processor 211 may determine that the electronic device 200 is in reduced power mode by monitoring the control output interface of the power management circuit IC 107 in a manner similar to that disclosed above for receiving control information from the control output interface 205 of the device processor 201.

When the display controller 203, through its sleep image display processor 211, determines that the electronic device 200 is operating in a reduced power mode of operation, the sleep image display processor 211 retrieves the display data for the stored image from the sleep image memory 209 and optionally determines (305) whether the display data was created at the display panel resolution. The sleep image display processor 211 may make such a determination by analyzing the graphics data format for the stored image display data, or the sleep image processor 211 may be hard coded with the determination based on the configuration of the sleep image memory 209 (e.g., the size of the sleep image memory 209 may have been selected under the presumption that the stored image would be a low resolution image requiring subsequent scaling by the sleep image processor 211 prior to display). If the stored image display data was created at the display panel resolution, the sleep image display processor 211 supplies (307) the display data for the stored sleep image to the display panel 105 for display by writing the display data to the appropriate locations in the data output buffer 121.

On the other hand, if the stored image display data was not created at the display panel resolution, the sleep image display processor 211 may modify (309) the stored image display data based on a scaling value to scale the stored image to the resolution of the display panel 105. In such a case, the scaling value may determined as a ratio between the display panel resolution and the stored image resolution (e.g., scaling value=display panel resolution/stored image resolution). Additionally, while such a scaling procedure may be used to upscale or downscale the stored image to the display panel resolution, the more likely scenario is that the sleep image display processor 211 would upscale the stored image display data because, if scaling is necessary, the stored image display data was likely created at a lower resolution than the display panel resolution in order to keep the sleep image memory 209 relatively small. After the stored image display data has been scaled to the display panel resolution, the sleep image display processor 211 supplies (311) the scaled display data for the stored sleep image to the display panel 105 for display by writing the scaled display data to the appropriate locations in the data output buffer 121.

According to one exemplary embodiment of the present invention, the predetermined image stored in the sleep image memory 209 is a time of day image and the device processor 201 and the sleep image display processor 211 coordinate to maintain and display a current time of day in the time of day image when the electronic device 200 is operating in reduced power mode. In this case, the control information supplied by the device processor 201 through the control output interface 205 may be a series of bits that indicate the current time of day as determined by the real time clock 127 of the electronic device 127, a single bit that toggles periodically (e.g., every minute as determined by the real time clock 127), a pair of bits for which the least significant bit toggles every minute and the most significant bit toggles every hour as determined by the real time clock 127, an electronic pulse supplied by the device processor 203 periodically (e.g., every minute) or at some other time interval conducive for updating the time of day as determined by the real time clock 127, or any other information from which the sleep image display processor 211 may determine the current time of day. Where the control information is an electronic pulse, the alternate display path of the display controller 203 may include a pulse counter 213 to maintain a count of the number of pulses received from the device processor 213. In such a case, the sleep image display processor 211 may be programmed to convert the pulse count supplied by the pulse counter 213 to a time of day, add the current time of day to the time of day image retrieved from the sleep image memory 209, and provide display data for the time of day image with the current time of day to the display panel 105 via the data output buffer 121. Thus, in this embodiment, the sleep image display processor 211 is operable to perform a clock function and the display data retrieved from the sleep image memory 209 and modified to contain the current time of day enables the display panel 105 to display the current time of day in the time of day image.

In yet another embodiment of the present invention, the display panel 105 may be a display technology that is susceptible to burn-in. In such a case, the sleep image display processor 211 may be programmed to vary the location of the displayed image on the display panel 105 while the electronic device 200 is operating in reduced power mode. An exemplary illustration of displaying a predetermined image at varying locations on the display panel 105 is shown in FIG. 4. In this example, the electronic device 200 may be a smartphone 401 and the predetermined image displayed on the display panel 403 may be a time of day image 405 in the hh:mm format. As illustrated in FIG. 4, the time of day image 405 may be moved from the upper left hand corner to the lower right hand corner of the display panel 403 over time while the smartphone 401 is in reduced power (standby or sleep) mode. While three possible positions of the time of day image 405 are illustrated in FIG. 4, those of ordinary skill in the art will readily recognize and appreciate that the predetermined image may be displayed at multiple other positions on the display panel 105, particularly where the displayed image occupies only a portion of the area of the display panel 105.

In an alternative embodiment, the sleep image memory 209 may store display data for a plurality of predetermined images instead of for a single image. In such a case, the sleep image display processor 211 may be programmed to select one or more of the images for display on the display panel 105, 403 when the electronic device 200 is operating in reduced power mode. For example, the sleep image display processor 211 may be programmed to randomly select one of the stored images for display or may select the images in a round robin manner. As an additional example, the sleep image display processor 211 may be programmed to change images each time the processor 211 changes position of the image on the display panel 105, 403 or at some other predefined sequence, where the image location is varied on the display panel 105, 403 to prevent burn-in as discussed above with respect to FIG. 4.

Referring now to FIG. 5, there is illustrated a partial electrical block diagram of an electronic device 500 that includes a display controller 105 which supports display of a predetermined image during a reduced power mode of the electronic device 500, in accordance with an alternative exemplary embodiment of the present invention. This embodiment is substantially identical to the embodiment described above with respect to FIG. 2, except that the real time clock (RC) oscillator and phase locked loop (PLL) 125 in the main display path of the display controller 203 of FIG. 2 has been replaced with a PLL 525 that receives its real time clock signal from the real time clock 127 of the power management IC 107. Additionally, the optional pulse counter 213 from the alternate display path of the display controller 203 of FIG. 2 has been omitted from the display controller 503 of FIG. 5. The configuration of the display controller 503 illustrated in FIG. 5 would enable the sleep image display processor 211 to obtain real time clock data directly from the PLL 525 of the display controller 503 instead of receiving it from the device processor 201. In such a case, the sleep image display processor 211 may use the clock data to perform a clock function upon detecting that the electronic device 500 is operating in reduced power mode, and display the current time of day in a prestored time of day image retrieved from the sleep image memory 209. As discussed above, the determination that the electronic device 500 is operating in reduced power mode may be made based on control information received from the control output interface 205 of the device processor 201.

The present invention encompasses a method and apparatus for displaying a predetermined image on a display panel of an electronic device when the electronic device is operating in a reduced power mode of operation. In this manner, the present invention provides a mechanism for providing a visually detectable sign of life to a user of an electronic device when the electronic device is operating in reduced power mode. The sign of life may be a static image or may be configured to convey usable information to the user, such as time of day, date, or other information. The present invention provides such a sign of life benefit while adding minimal additional complexity to the display controller. Importantly, the present invention adds minimal additional power drain during reduced power mode by eliminating the need for the device processor to supply the display data for the sleep image, in contrast to conventional screen savers.

As detailed above, embodiments of the present invention reside primarily in combinations of method steps and/or apparatus components related to displaying information on a display panel of an electronic device when the electronic device is operating in a reduced power mode of operation. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as "first" and "second," "top" and "bottom," and the like may be used solely to distinguish one entity or action from another entity or action without necessarily requiring or implying any actual relationship or order between such entities or actions. The terms "comprises," "comprising," "includes," "including," "has," "having," "contains," "containing," and any other variations thereof are intended to cover a non-exclusive inclusion, such that a process, method, article, or apparatus that comprises, includes, has, or contains a list of elements does not include only those elements but may include other elements not expressly listed or inherent to such process, method, article, or apparatus. The term "plurality of" as used in connection with any object or action means two or more of such object or action. A claim element proceeded by the article "a" or "an" does not, without more constraints, preclude the existence of additional identical elements in the process, method, article, or apparatus that includes the element.

It will be appreciated that embodiments of the electronic device 200, 401, 500 described herein may be comprised of one or more conventional processors and unique stored program instructions that control the processor(s) to implement, in conjunction with certain non-processor circuits, some, most, or all of the functions of the electronic device 200, 401, 500 and its operational methods as described herein. The non-processor circuits may include, but are not limited to, storage devices (such as memory 117, 209), the oscillator 109, the real time clock 127, the real time oscillator and phased lock loop 125, the phase locked loop 525, and the display panel 105, 403 described above, as well as filters, other clock circuits, and various other non-processor circuits. As such, the functions of the processor and non-processor circuits may be collectively interpreted as steps of a method for displaying information on a display panel of an electronic device when the electronic device is operating in a reduced power mode of operation. Alternatively, some or all functions could be implemented by a state machine that has no stored program instructions, or in one or more application specific integrated circuits (ASICs), in which each function or some combinations of certain of the functions are implemented as custom logic. Of course, a combination of the various approaches could be used. Thus, methods and means for these functions have been generally described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions or programs and integrated circuits without undue experimentation.

In the foregoing specification, specific embodiments of the present invention have been described. However, one of ordinary skill in the art will appreciate that various modifications and changes can be made without departing from the scope of the present invention as set forth in the appended claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims and all equivalents of those claims as issued.

What is claimed is:

1. A display controller comprising:
a processor interface configured to receive control information including a periodic pulse from a device processor of an electronic device when the electronic device is operating in a reduced power mode of operation, the control information excluding display data;

a memory configured to store display data for a time of day image;

a display processor operably coupled to the processor interface and the memory; and a pulse counter coupled between the processor interface and the display processor that receives the periodic pulse at a time interval conducive for updating a time of day included in the time of day image, and send, to the display processor, a count of a number of pulses received by the pulse counter, wherein the display processor is configured to:
  determine, based on the count of the number of pulses, a current time of day;
  update, based on the current time of day, the display data for the time of day image; and
  provide the display data for the time of day image to a display panel of the electronic device so as to enable the display panel to display the time of day image.

2. The display controller of claim 1, wherein the processor interface is an inter-integrated circuit (I2C) interface and wherein the control information is an I2C command.

3. The display controller of claim 1, wherein the processor interface is a first processor interface, the display controller further comprising:
  a second processor interface configured to receive display data for one or more images from the device processor of the electronic device when the electronic device is operating in the full power mode of operation,
  wherein the first processor interface is time-multiplexed with the second processor interface.

4. The display controller of claim 1, wherein the display data for the time of day image causes the time of day image to be displayed in only a portion of the display panel.

5. The display controller of claim 4, wherein the portion of the display panel is less than half of an area of the display panel.

6. The display controller of claim 4, wherein the display processor is configured to provide the display data for the time of day image to the display panel so as to cause the time of day image to be displayed at varying locations on the display panel over time.

7. The display controller of claim 1,
  wherein the display processor is further configured to process the display data for the time of day image to produce scaled display data that scales the time of day image to a predetermined display resolution, and
  wherein the display data for the time of day image provided to the display panel is the scaled display data.

8. An electronic device comprising:
a display controller comprising a first processor interface, a second processor interface, a pulse counter, a first memory, a second memory, a first display controller, and a second display controller;
a device processor configured to:
  execute an application;
  when the electronic device is operating in a full power mode of operation:
    generate first display data for one or more images to be displayed by the application; and
    send the first display data to the display controller; and
  when the electronic device is operating in a reduced power mode of operation, send a periodic pulse to the display controller; and a display panel,
wherein the display controller is operably coupled to the device processor and the display panel,
wherein the first processor interface is configured to receive the first display data from the device processor when the electronic device is operating in the full power mode of operation,
wherein the second processor interface is configured to receive the control information from the device processor when the electronic device is operating in the reduced power mode of operation,
wherein the first memory is operably coupled to the first processor interface and configured to store the first display data,
wherein the second memory configured to store second display data for a time of day image,
wherein the first display processor is operably coupled to the first memory and configured to provide the first display data to the display panel to enable the display panel to display the one or more images,
wherein the pulse counter is operably coupled to the second processor interface and the second display processor and, when the electronic device is operating in the reduced power mode of operation, is configured to receive a periodic pulse from the device processor at a time interval conducive for updating a time of day included in the time of day image, and send, to the second display processor, a count of a number of pulses received by the pulse counter; and
wherein the second display processor is operably coupled to the pulse counter and the second memory, and is configured to determine, based on the count of the number of pulses, a current time of day, update, based on the current time of day, the second display data for the time of day image, and provide the second display data to the display panel to enable the display panel to display the time of day image.

9. The electronic device of claim 8, wherein the second display data causes the time of day image to be displayed in only a portion of the display panel.

10. The electronic device of claim 9, wherein the second display processor is configured to provide the second display data to the display panel so as to cause the time of day image to be displayed at varying locations on the display panel over time.

11. The electronic device of claim 8,
  wherein the second display processor is further configured to process the second display data to produce scaled display data that scales the time of day image to a predetermined display resolution, and
  wherein the second display data provided to the display panel is the scaled display data.

12. The electronic device of claim 8, wherein the electronic device comprises one of a smartphone, a cellular phone, a multimedia player, a personal digital assistant, a portable gaming device, a tablet computer, and a laptop computer.

13. A method comprising:
storing, by a display controller of an electronic device and in a memory of the display controller, display data for a time of day image;
determining, by the display controller, whether an electronic device is operating in a reduced power mode of operation; and
responsive to determining that the electronic device is operating in the reduced power mode of operation:
  receiving, by a processor interface of the electronic device and from a device processor of the electronic device, control information including a periodic pulse and excluding display data;

receiving, by a pulse counter coupled between the processor interface and the display controller, the periodic pulse at a time interval conducive for updating a time of day included in the time of day image;

sending, by the pulse counter and to the display processor, a count of a number of pulses received by the pulse counter;

determining, by the display processor and based on the number of pulses received from the pulse counter, a current time of day;

updating, by the display processor and based on the current time of day, the display data for the time of day image; and providing, by the display controller, the display data for the time of day image to a display panel to enable the display panel to display the time of day image.

14. The method of claim 13, wherein supplying the display data to the display panel to enable the display panel to display the time of day image comprises:
supplying the display data to the display panel so as to enable the display panel to display the time of day image at varying locations on the display panel over time while the electronic device is operating in the reduced power mode of operation.

15. The method of claim 13, wherein supplying the display data to the display panel to enable the display panel to display the time of day image comprises:
modifying the display data based on a scaling value to produce scaled display data, the scaling value representing a ratio between a resolution of the display panel and a resolution at which the time of day image was created; and
supplying the scaled display data to the display panel to enable the display panel to display the time of day image at the resolution of the display panel.

* * * * *